(12) United States Patent
Hartel et al.

(10) Patent No.: US 6,945,757 B2
(45) Date of Patent: Sep. 20, 2005

(54) MOTOR PUMP UNIT, PARTICULARLY A MOTOR VEHICLE BRAKING DEVICE

(75) Inventors: Gerd Hartel, Kuemach (DE); Horst Steegmüller, Würzburg (DE); Matthias Tupy, Gerbrunn (DE)

(73) Assignee: Siemens Aktiengesellschaft, Munich (DE)

( * ) Notice: Subject to any disclaimer, the term of this patent is extended or adjusted under 35 U.S.C. 154(b) by 89 days.

(21) Appl. No.: 10/621,539

(22) Filed: Jul. 17, 2003

(65) Prior Publication Data

US 2005/0088054 A1 Apr. 28, 2005

Related U.S. Application Data

(63) Continuation of application No. PCT/DE02/00078, filed on Jan. 11, 2002.

(30) Foreign Application Priority Data

Jan. 18, 2001 (DE) ............................... PCT/DE01/00204
Dec. 18, 2001 (DE) ........................................... 10162247

(51) Int. Cl.$^7$ ............................ F04B 17/03; H02K 5/00
(52) U.S. Cl. ..................... 417/360; 417/410.1; 417/415
(58) Field of Search .............................. 417/410.1, 415, 417/360; 310/71, 91

(56) References Cited

U.S. PATENT DOCUMENTS

| | | | | |
|---|---|---|---|---|
| 1,244,533 | A | 10/1917 | Morse | 464/104 |
| 1,488,497 | A | 4/1924 | Higgins | 464/105 |
| 4,049,364 | A | 9/1977 | Ross et al. | 417/360 |
| 4,941,861 | A | 7/1990 | Painter | 464/102 |
| 5,022,645 | A | 6/1991 | Green | 464/104 |
| 5,284,455 | A | 2/1994 | Kuribayashi | 464/105 |
| 5,895,207 | A | * 4/1999 | Burgdorf et al. | 417/410.1 |
| 6,011,341 | A | 1/2000 | Toya et al. | 310/239 |
| 6,241,489 | B1 | * 6/2001 | Lewin et al. | 417/410.1 |

FOREIGN PATENT DOCUMENTS

| | | | |
|---|---|---|---|
| DE | 42 35 962 A1 | 5/1994 | H02K/5/14 |
| DE | 197 56 729 A1 | 12/1997 | H02K/11/00 |
| EP | 0645875 B1 | 4/1995 | H02K/23/66 |
| EP | 1 038 745 A2 | 2/2000 | B60T/8/40 |
| EP | 0 645 875 B2 | 1/2001 | H02K/23/66 |
| EP | 0695875 | 6/2001 | F15B/11/00 |
| GB | 771595 | 4/1957 | |
| JP | 05288143 | 11/1993 | F04B/1/04 |
| JP | 09098559 | 4/1997 | H02K/23/00 |
| JP | 2000127934 | 5/2000 | B60T/8/34 |
| WO | WO95/08209 | 9/1994 | H02K/5/14 |
| WO | WO96/28327 | 3/1995 | B60T/8/36 |
| WO | WO98/16986 | 9/1996 | H02K/5/10 |
| WO | WO98/16988 | 10/1996 | H02K/5/22 |
| WO | WO98/56630 | 4/1998 | B60T/8/36 |
| WO | WO01/26945 | 4/2001 | B60T/8/36 |
| WO | WO94/27045 | 6/2001 | F04B/17/00 |
| WO | WO02/057125 | 7/2002 | B60T/8/36 |

* cited by examiner

*Primary Examiner*—Charles G. Freay
(74) *Attorney, Agent, or Firm*—Baker Botts L.L.P.

(57) ABSTRACT

Despite the axial sandwich assembly of the motor housing (1), pump housing (2) and electronics housing (3), it is possible by using simple manufacturing and assembly techniques to provide a plug connection, which is free from distortions and resistant to breaking, with supply lines and control lines (4.1; 4.2) that start from a brush plate (6) inside the motor housing (1) and pass through the pump housing (2) up to the electronics housing (3). To this end, the supply and control lines (4.1; 4.2) are fastened in the manner of a fixed plug via their ends, which are located on the motor housing, as a pre-assembled component to a fastening flange (6.2) that radially projects above the motor housing (1). The fastening flange (6.2), in the plugging direction counter to its plug connection with the electronics housing (3), can be supported via at least one supporting rib (6.1) on the outer periphery of the motor housing (1).

18 Claims, 2 Drawing Sheets

MOTOR PUMP UNIT, PARTICULARLY A MOTOR VEHICLE BRAKING DEVICE

CROSS REFERENCE TO RELATED APPLICATION

This application is a continuation of copending International Application No. PCT/DE02/00078 filed Jan. 11, 2002, which designates the United States, and claims priority to PCT/DE01/00204 filed Jan. 18, 2001 and German Application DE 10162247.3 filed Dec. 18, 2001.

TECHNICAL FIELD OF THE INVENTION

The invention relates to a motor pump unit, particularly a motor vehicle braking device.

BACKGROUND OF THE INVENTION

A motor vehicle braking device is known from EP 0 645 875 B1. The supply and control lines connected electrically on the motor housing to a brush plate pass through the front faces of the motor housing and electronics housing or pump housing and electronics housing located one in front of the other and are laid inside the housing. According to one configuration, the supply and control lines are located in the motor housing within axial spacers between the front faces of stator field magnets, particularly by injection, with the option of extending the spacers through the pump housing to simplify assembly by establishing an automatic plug-in contact between the injected supply and control lines and the connector component of the electronics housing.

A pump drive motor for a motor vehicle anti-lock braking system is also known from EP 1 038 745 A2. This drive motor has a connector plug, which extends through the pump unit and serves to supply power to the drive motor. The connector plug is located within the side of the housing of the electric motor and is part of the brush holder. One disadvantage of this arrangement is the restriction of structural freedom when constructing the pump unit. Positioning the connector plug close to the motor drive shaft significantly restricts the useable space within the pump unit.

SUMMARY OF THE INVENTION

According to the object of the present invention, whilst guaranteeing operational safety, the contact between the plug-type supply and control lines on the one hand and the connector component, e.g. a circuit board, of the electronics housing is to be simplified as far as manufacturing and assembly techniques are concerned, with the axial sandwich assembly of the motor housing and pump housing and the pump housing and electronics housing with simultaneous electrical contact between the electrical components in the motor housing on the one hand and in the electronics housing on the other hand.

At the same time the structurally available space near to the motor output shaft in the pump unit is to be restricted as little as possible by the arrangement of the supply and control lines.

This object can be achieved by a motor pump unit including a motor housing, a pump housing, and an electronics housing comprising at least two plug-type supply and control lines configured in an axially rigid manner and insulated electrically from each other leading through the pump housing to the electronics housing; a brush support plate for securely fixing the plug-type supply and control lines on the motor housing; an electronics unit in the electronics housing and means for plugging in the plug-type supply and control lines to make contact with the electronics unit; a fastening flange projecting radially above the edge of the motor housing for radially fixing the plug-type supply and control line; and at least one external supporting rib for supporting the brush support plate on the outer periphery of the motor housing counter to the plug connection of the supply and control lines.

The object can also be achieved by a motor pump unit, particularly a motor vehicle braking device, including in an axial one-behind-the-other sandwich arrangement a motor housing, a pump housing, and an electronics housing, comprising at least two plug-type supply and control lines insulated electrically from each other leading through the pump housing to the electronics housing; a brush support plate for securely fixing the plug-type supply and control lines on the motor housing, wherein the plug-type supply and control lines are configured in an axially rigid manner; wherein the plug-type supply and control lines can be plugged in to make contact with an electronics unit in the electronics housing whilst supported axially in respect of the motor housing; wherein the plug-type supply and control lines are fixed radially outside the motor housing to a fastening flange of the brush support plate projecting radially above the edge of the motor housing; and wherein the brush support plate can be supported by at least one external supporting rib on the outer periphery of the motor housing counter to the plug connection of the supply and control lines.

The at least one supporting rib can be fixed to the radially projecting fastening flange. The at least one supporting rib and the fastening flange may form a single component of the brush support plate, particularly a single injection-molded plastic component. The arrangement of the at least one supporting rib can be arranged or configured so that it is subject to an operating pressure when supported on the motor housing. The plug-type supply and control lines may be configured as flat plug-in tongues and can be moved flexibly across their longitudinal extension for the purposes of tolerance compensation. The plug-type supply and control lines may be components, particularly single, bent components produced by bending and punching, of a punched lattice accommodated by the brush support plate. The plug-type supply and control lines can be embedded in an elastic insulating sleeve. The elastic insulating sleeve can be attached to the plug-type supply and control lines as a pre-assembled component, particularly from the latter's free ends facing the electronics housing. A common elastic insulating sleeve may be provided for at least two, preferably parallel, plug-type supply and control lines. During assembly of the motor housing pre-fitted with the brush support plate with the pump housing and the electronics housing, the plug-type supply and control lines can be forced to make contact with the corresponding connector component on said housing.

Fixing the plug-type supply and control lines, which preferably project in a tongue-like manner perpendicular to the brush plate, in the socket on the motor, particularly on the brush plate, means that they can be manufactured as a pre-assembled unit with this component and contact can be established during assembly of the housing, with the usual flexibility of the supply and control lines interacting with the elastic insulation allowing radial mechanical distortion loads particularly to be avoided by means of reciprocal displacement tolerances of the housing to be assembled and sealed in its own respect or in respect of the supply and control lines. Unwanted axial pressure loads acting on the brush support plate, particularly in proximity to the fastening flange projecting radially above the motor housing, in which the plug-type supply and control lines are fixed, can be absorbed by the supporting rib.

With further simplification of manufacture and assembly the supply and control lines are a single component of a punched lattice injected into the brush support plate, said lattice serving to connect further components, e.g. interference suppressors and particularly the brushes supplying the rotor winding.

BRIEF DESCRIPTION OF THE DRAWINGS

The invention and advantageous embodiments of the invention according to features of the subclaims are described in more detail below using schematic examples in the drawing. These show FIG. 1 an axial sub-section of a fully assembled motor pump unit;

DETAILED DESCRIPTION OF THE PREFERRED EMBODIMENTS

Figure 1:
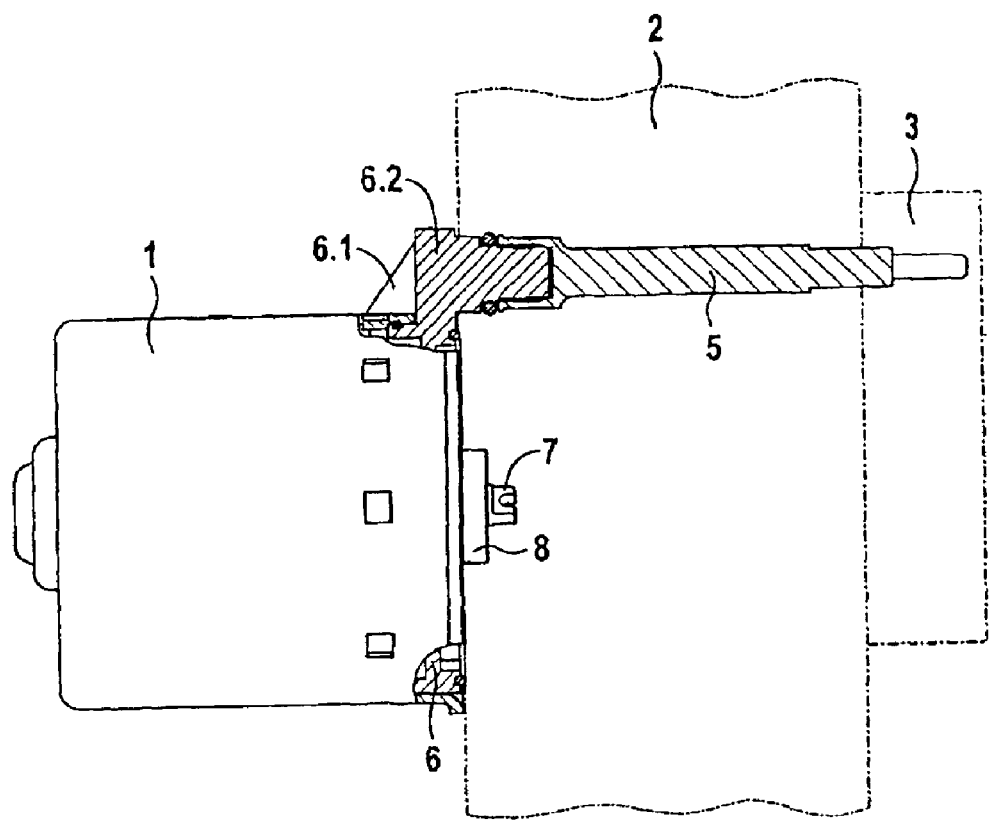
Figure 2:
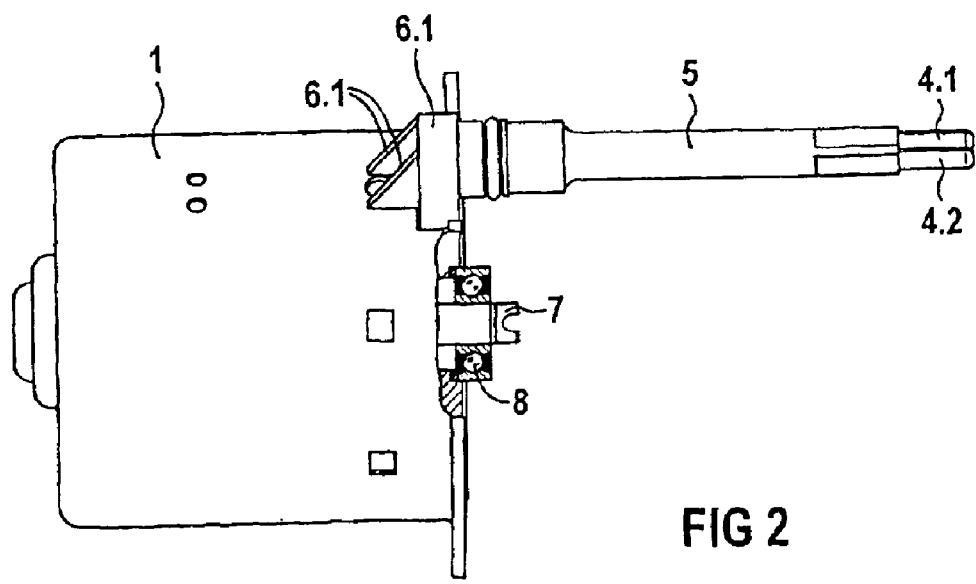
FIG. 2 a motor housing with output to a pump housing and with a plug-type supply and control line connection to an electronics housing in the form of a pre-assembled unit.
Figure 3:
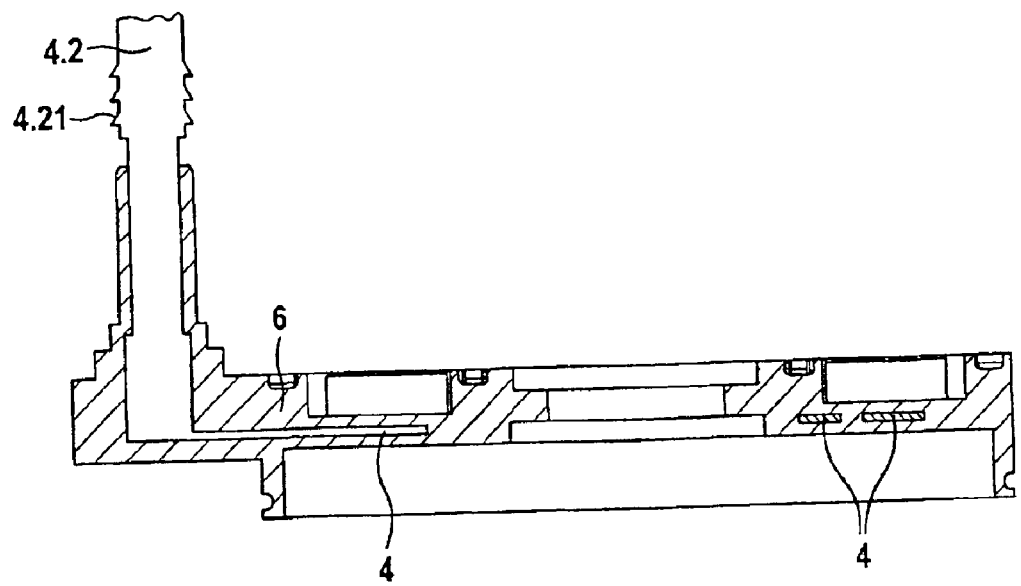
FIG. 3 a horizontal section through a brush support plate with an injected punched lattice.
Figure 4:
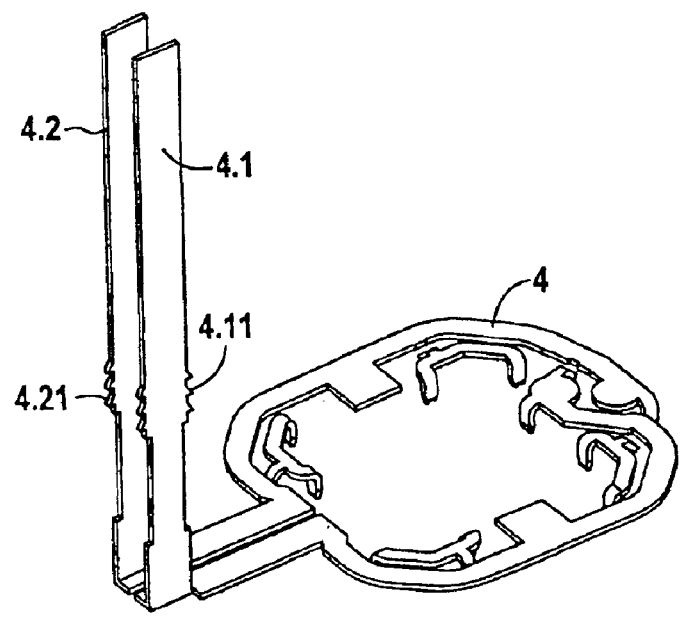
FIG. 4 a perspective view of a punched lattice injected into the brush support plate with plug-type supply and control lines bent downward in the manner of a flat tongue and in the form of a single component.

FIG. 1 shows an axial sub-section of a complete motor pump unit, for example for use in a motor vehicle anti-lock braking device. A pump housing 2 of a high-pressure pump for hydraulic brake fluid is flange mounted in a sealed manner via its front face onto a cup-shaped motor housing 1 of an electric motor. An electronics housing 3 is assembled on the other front face of the pump housing 2 and accommodates a connector unit—not shown separately here but known for example from EP 0 645 875 B1—particularly a supply and control unit, e.g. in the form of a circuit board for the electric motor.

In proximity to the side of the cup edge the motor housing 1 is sealed off by means of a brush support plate 6, from which one end of a rotor shaft 7 of the electric motor projects, said shaft being held in a bearing 8 and being such that it can be connected to a pump shaft of the high pressure pump in a manner known for example from EP 0 645 875 B1 but not shown in more detail here.

Electrical connection between the electronics housing 3 and the electrical components accommodated by the brush support plate 5, particularly brushes, is established by plug-type, tongue-shaped supply and control lines 4.1;4.2, which—as shown in FIG. 1—run essentially perpendicular to the plane of the brush support plate 6 within the pump housing 2 and can as a result be easily protected from external influences.

The plug-type, tongue-shaped supply and control lines 4.1;4.2 are configured to form a pre-assembled component with their motor housing ends fixed in the brush support plate 6 in proximity to a fastening flange 6.2 projecting radially above the motor housing 1, in the form of a single component with a punched lattice 4 injected into the brush support plate 6, said lattice serving in a known manner to connect the structural elements accommodated by the brush support plate 5 and bent down from a surface punched initially in the plane of the punched lattice 4.

An elastic insulation sleeve 5, which can be attached axially according to FIG. 1 for example and can be fixed in its operating position by means of a catch 4.11;4.12, is provided for the electrical insulation of the supply and control lines 4.1;4.2 so that the ends facing away from the motor housing in the sandwich assembly of the motor housing 1, pump housing 2 and electronics housing 3 can yield across their axial direction of extension for tolerance compensation purposes despite possible reciprocal displacement of the housing components to be assembled together, as a result of which a sealed passage can be guaranteed through the front faces of the housings and mechanical stress loads can be avoided.

To absorb the axial pressure occurring during assembly of the complete unit and particularly when inserting the supply and control lines 4.1;4.2 in their counter-plug in the connector unit in the electronics housing 3 on the brush support plate 6, particularly in proximity to the fastening flange projecting radially above the motor housing 1, at least one supporting rib 6.1 is advantageously provided, by means of which the fastening flange 6.2 is in contact with the outer periphery of the motor housing 1.

Expediently the fastening flange 6.2 and the supporting rib 6.1 are configured together with the brush support plate 6 as a single injection-molded component and the supporting rib 6.1 is slightly oversized so that it can be supported with a slight pressure on the outer periphery of the motor housing 1 taking into account all tolerances after assembly of the unit.

The essential concept of the invention can be summarized as follows: Despite the axial sandwich assembly of the motor housing 1, pump housing 2 and electronics housing 3, it is possible by using simple manufacturing and assembly techniques to provide a plug connection, which is free from distortions and resistant to breaking, with supply lines and control lines 4.1;4.2 that start from a brush support plate 6 inside the motor housing 1 and pass through the pump housing 2 up to the electronics housing 3. To this end, the supply and control lines 4.1;4.2 are fastened in the manner of a fixed plug via their ends, which are located on the motor housing, as a pre-assembled component, to a fastening flange 6.2 that radially projects above the motor housing 1. The fastening flange 6.2, in the plugging direction counter to its plug connection with the electronics housing 3, can be supported via at least one supporting rib 6.1 on the outer periphery of the motor housing 1.

What is claimed is:

1. A motor pump unit, for a motor vehicle braking device, in an axial one-behind-the-other sandwich arrangement:
   a motor housing,
   a pump housing, and
   an electronics housing:
   at least two plug-type supply and control lines insulated electrically from each other leading through the pump housing to the electronics housing;
   a brush support plate for securely fixing the plug-type supply and control lines on the motor housing, wherein the plug-type supply and control lines are
   (i) configured in an axially rigid manner,
   (ii) plugged in to make contact with an electronics unit in the electronics housing whilst supported axially in respect of the motor housing,
   (iii) fixed radially outside the motor housing to a fastening flange of the brush support plate projecting radially above the edge of the motor housing; and
   the brush support plate is supported by at least one external supporting rib on the outer periphery of the motor housing counter to the plug connection of the supply and control lines.

2. A motor pump unit according to claim 1, wherein the at least one supporting rib is fixed to the radially projecting fastening flange.

3. A motor pump unit according to claim 1, wherein the at least one supporting rib and the fastening flange form a single component of the brush support plate.

4. A motor pump unit according to claim 1, wherein the arrangement of the at least one supporting rib is arranged or configured so that it is subject to an operating pressure when supported on the motor housing.

5. A motor pump unit according to claim 1, wherein the plug-type supply and control lines are configured as flat plug-in tongues and can be moved flexibly across their longitudinal extension for the purposes of tolerance compensation.

6. A motor pump unit according to claim 1, wherein
the plug-type supply and control lines are single, bent components produced by bending and punching, of a punched lattice accommodated by the brush support plate; and
the plug-type supply and control lines are embedded in an elastic insulating sleeve.

7. A motor pump unit according to claim 6, wherein the elastic insulating sleeve is attached to the plug-type supply and control lines as a pre-assembled from the latter's free ends facing the electronics housing.

8. A motor pump unit according to claim 7, wherein a common elastic insulating sleeve is provided for the at least two, parallel, plug-type supply and control lines.

9. A motor pump unit according to claim 1, wherein during assembly of the motor housing pre-fitted with the brush support plate with the pump housing and the electronics housing, the plug-type supply and control lines can be forced to make contact with the corresponding connector component on said housing.

10. A motor pump unit including a motor housing, a pump housing, and an electronics housing comprising:
at least two plug-type supply and control lines configured in an axially rigid manner and insulated electrically from each other leading through the pump housing to the electronics housing;
a brush support plate for securely fixing the plug-type supply and control lines on the motor housing;
an electronics unit in the electronics housing and means for plugging in the plug-type supply and control lines to make contact with the electronics unit;
a fastening flange projecting radially above the edge of the motor housing for radially fixing the plug-type supply and control line; and
at least one external supporting rib for supporting the brush support plate on the outer periphery of the motor housing counter to the plug connection of the supply and control lines.

11. A motor pump unit according to claim 10, wherein the at least one supporting rib is fixed to the radially projecting fastening flange.

12. A motor pump unit according to claim 10, wherein the at least one supporting rib and the fastening flange form a single component of the brush support plate.

13. A motor pump unit according to claim 10, wherein the arrangement of the at least one supporting rib is arranged or configured so that it is subject to an operating pressure when supported on the motor housing.

14. A motor pump unit according to claim 10, wherein the plug-type supply and control lines are configured as flat plug-in tongues and can be moved flexibly across their longitudinal extension for the purposes of tolerance compensation.

15. A motor pump unit according to claim 10, wherein
the plug-type supply and control lines are single, bent components produced by bending and punching, of a punched lattice accommodated by the brush support plate; and
the plug-type supply and control lines are embedded in an elastic insulating sleeve.

16. A motor pump unit according to claim 15, wherein the elastic insulating sleeve is attached to the plug-type supply and control lines as a pre-assembled component, from the latter's free ends facing the electronics housing.

17. A motor pump unit according to claim 16, wherein a common elastic insulating sleeve is provided for the at least two, parallel, plug-type supply and control lines.

18. A motor pump unit according to claim 10, wherein during assembly of the motor housing pre-fitted with the brush support plate with the pump housing and the electronics housing, the plug-type supply and control lines can be forced to make contact with the corresponding connector component on said housing.

* * * * *